United States Patent
Marshall et al.

(10) Patent No.: US 10,152,754 B2
(45) Date of Patent: Dec. 11, 2018

(54) SYSTEM AND METHOD FOR SMALL BUSINESS OWNER IDENTIFICATION

(71) Applicant: American Express Travel Related Services Company, Inc., New York, NY (US)

(72) Inventors: Vernon Marshall, London (GB); Arnab Bose, Jersey City, NJ (US); Houman Motaharian, Glen Rock, NJ (US); Ashish Kapatia Sharma, Jersey City, NJ (US); Surabhi Singhal, Harrison, NJ (US); Chao Yuan, Montclair, NJ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 379 days.

(21) Appl. No.: 14/957,121

(22) Filed: Dec. 2, 2015

(65) Prior Publication Data
US 2017/0161842 A1    Jun. 8, 2017

(51) Int. Cl.
*G06Q 10/06*    (2012.01)
*G06Q 20/10*    (2012.01)
(Continued)

(52) U.S. Cl.
CPC ........... *G06Q 40/12* (2013.12); *G06Q 40/025* (2013.01)

(58) Field of Classification Search
CPC ........ G06Q 30/02; G06Q 40/00; G06Q 10/00; G06Q 10/06
(Continued)

(56) References Cited

U.S. PATENT DOCUMENTS

| | | | |
|---|---|---|---|
| 7,690,564 B2 * | 4/2010 | Rane | G06Q 30/02 235/375 |
| 7,853,469 B2 * | 12/2010 | Maitland | G06Q 10/0631 705/7.12 |

(Continued)

OTHER PUBLICATIONS

Final office Action dated Apr. 18, 2018 in U.S. Appl. No. 14/945,032.
(Continued)

*Primary Examiner* — Oluseye Iwarere
(74) *Attorney, Agent, or Firm* — Snell & Wilmer, L.L.P.

(57) ABSTRACT

Systems and methods of improving the operation of a transaction network and transaction network devices is disclosed. A SBO identification network host may comprise various modules and engines as discussed herein wherein the probability that a cardholder is a small business owner may be evaluated for establishing proper usage of differentiated transaction instruments according to their proper purposes, marketing and cross-marketing of differentiated transaction instruments, and provision of value-added services. For instance, a probable SBO may be identified, whereby the SBO identification network network may tailor the handling of the transactions, such as by denying them, whereby the transaction network may actively deter misuse of transaction products, or tailor the handling of electronically delivered advertisements, such as by targeting them, whereby the SBO identification network more properly functions according to approved parameters.

20 Claims, 6 Drawing Sheets

(51) Int. Cl.
*G06Q 40/02* (2012.01)
*G06Q 40/00* (2012.01)

(58) Field of Classification Search
USPC ................................. 705/39, 14.53, 7.36
See application file for complete search history.

(56) References Cited

U.S. PATENT DOCUMENTS

| | | | | |
|---|---|---|---|---|
| 8,401,890 B1* | 3/2013 | Brack | ..................... | G06Q 10/06 705/7.36 |
| 8,429,068 B1* | 4/2013 | Fasoli | ..................... | G06Q 40/02 705/1.1 |
| 8,660,945 B1* | 2/2014 | Pariante | ................. | G06Q 20/04 705/39 |
| 9,542,688 B2* | 1/2017 | Bernard | .............. | G06Q 30/0201 |
| 9,921,072 B2* | 3/2018 | Spears | ............... | G01C 21/3484 |
| 9,947,020 B2* | 4/2018 | Fordyce, III | ........ | G06Q 30/0201 |
| 2002/0023215 A1 | 2/2002 | Wang | | |
| 2003/0061132 A1* | 3/2003 | Yu, Sr. | ................... | G06Q 30/02 705/30 |
| 2005/0027723 A1 | 2/2005 | Jones | | |
| 2005/0144451 A1 | 6/2005 | Voice | | |
| 2005/0149761 A1 | 7/2005 | Chiviendacz | | |
| 2005/0197954 A1* | 9/2005 | Maitland | ............ | G06Q 10/0631 705/39 |
| 2006/0085473 A1* | 4/2006 | Thormaehlen | ......... | G06Q 10/06 |
| 2007/0005967 A1 | 1/2007 | Mister | | |
| 2007/0064598 A1 | 3/2007 | Nooner | | |
| 2008/0086759 A1* | 4/2008 | Colson | .................... | G06F 21/34 726/2 |
| 2009/0013194 A1 | 1/2009 | Mir | | |
| 2009/0136121 A1 | 5/2009 | Nakagaki | | |
| 2009/0204613 A1 | 8/2009 | Muroi | | |
| 2009/0254463 A1 | 10/2009 | Tomchek | | |
| 2010/0082384 A1* | 4/2010 | Bohrer | .................... | G06Q 30/02 705/7.29 |
| 2010/0088338 A1 | 4/2010 | Pavoni | | |
| 2011/0047072 A1* | 2/2011 | Ciurea | ................... | G06Q 20/10 705/39 |
| 2011/0093324 A1* | 4/2011 | Fordyce, III | ........... | G06Q 20/10 705/14.27 |
| 2011/0264497 A1* | 10/2011 | Clyne | .................... | G06Q 20/10 705/14.17 |
| 2011/0264567 A1* | 10/2011 | Clyne | .................... | G06Q 20/10 705/30 |
| 2011/0313835 A1* | 12/2011 | Falkenborg | ........ | G06Q 30/0224 705/14.25 |
| 2011/0313900 A1* | 12/2011 | Falkenborg | .......... | G06Q 20/227 705/30 |
| 2012/0022945 A1* | 1/2012 | Falkenborg | ........ | G06Q 30/0255 705/14.53 |
| 2012/0066065 A1* | 3/2012 | Switzer | .................. | G06Q 20/10 705/14.53 |
| 2013/0066771 A1* | 3/2013 | Ciurea | ............... | G06Q 30/0201 705/39 |
| 2013/0073464 A1* | 3/2013 | Magpayo | ........... | G06Q 30/0256 705/44 |
| 2013/0151388 A1* | 6/2013 | Falkenborg | ............ | G06Q 40/02 705/35 |
| 2014/0046827 A1* | 2/2014 | Hochstatter | ........ | G06Q 20/4016 705/38 |
| 2014/0046842 A1 | 2/2014 | Irudayam | | |
| 2014/0136104 A1* | 5/2014 | Spears | ............... | G01C 21/3484 701/521 |
| 2014/0165133 A1 | 6/2014 | Foley | | |
| 2014/0172576 A1* | 6/2014 | Spears | ............... | G06Q 30/0266 705/14.63 |
| 2015/0127516 A1 | 5/2015 | Studnitzer | | |
| 2015/0161301 A1 | 6/2015 | Begur | | |
| 2015/0178532 A1 | 6/2015 | Brule | | |
| 2015/0227931 A1 | 8/2015 | Genovez | | |
| 2016/0014148 A1 | 1/2016 | Lee | | |
| 2016/0070971 A1 | 3/2016 | Nakashima | | |
| 2016/0080493 A1 | 3/2016 | Roth | | |
| 2016/0203478 A1 | 7/2016 | Gardiner | | |

OTHER PUBLICATIONS

Notice of Allowance dated May 22, 2018 in U.S. Appl. No. 14/944,902.
Final office Action dated May 30, 2018 in U.S. Appl. No. 14/944,898.
Notice of Allowance dated Jun. 12, 2018 in U.S. Appl. No. 14/944,961.
Advisory Action dated Jun. 27, 2018 in U.S. Appl. No. 14/945,032.
U.S. Appl. No. 16/036,326 dated Jul. 16, 2018 and titled Lineage Data for Big Data Records.
Non-Final Office Action dated Aug. 3, 2018 in U.S. Appl. No. 14/945,032.
Non-Final Office Action dated Aug. 3, 2018 in U.S. Appl. No. 14/944,898.

* cited by examiner

| | Variable | Source | Importance |
|---|---|---|---|
| 213-1 | Commercial bureau hit | Prospect | 100.00 |
| 213-2 | Total business spend | Transaction | 85.17 |
| 213-3 | % Payments made through Company Checks | Bank Remit | 42.30 |
| 213-4 | Customer's Prob-B | Transaction | 41.93 |
| 213-5 | Count of Commercial Bureau hits (CCSG CM is matched to a business from trusted source on prospect database; D&B, Infogroup, Equifax, Other source lists) | Prospect | 38.71 |
| 213-6 | # Active supplementary relationships of the CM | Demographics | 35.02 |
| 213-7 | Unique Email Domain indicator | Email | 26.09 |
| 213-8 | # Commercial Inquires from Experian | Accounts Monitor | 22.28 |
| 213-9 | % OPEN / Merchant pages visited | Online behavior | 19.85 |
| 213-10 | % OPEN CMs living in CM's neighborhood | Neighborhood | 19.03 |
| 213-11 | 3rd highest Prob-B | Transaction | 16.07 |
| 213-12 | 2nd highest Prob-B | Transaction | 9.73 |
| 213-13 | Highest Prob-B | Transaction | 6.11 |

FIG. 5

SYSTEM AND METHOD FOR SMALL BUSINESS OWNER IDENTIFICATION

FIELD

The present disclosure relates to data analytics for transaction data.

BACKGROUND

Large data sets may exist in various sizes and with various levels of organization. With big data comprising data sets as large as ever, the volume of data collected incident to the increased popularity of online and electronic transactions continues to grow. Billions of rows and hundreds of thousands of columns worth of data may populate a single table, for example. An example of the use of big data is in identifying and categorizing business spending and consumer spending, which is frequently a key priority for transaction card issuers. In that regard, transactions processed by the transaction card issuer are massive in volume and comprise tremendously large data sets.

Large data sets may have challenges. For example, cardholders may frequently hold a business-oriented transaction card, but various merchants may or may not accept the business-oriented transaction card. Similarly, cardholders may hold a consumer-oriented transaction card, but may complete business transactions using the card. These actions confuse and frustrate the identification and categorization of transaction data, and obscure the identity and categorization of real-world entities and individuals behind transactions, while also hampering data analytics.

SUMMARY

In accordance with various embodiments, a SBO identification network host is disclosed. The SBO identification host may include a decisioning engine in communication with the processor and configured to accept data elements from a data element source set associated with a cardholder from a node of a distributed storage system and configured to compute a SBO score associated with the cardholder according to a SBO identification methodology. The SBO identification host may include a SBO tag decisioner in communication with the processor and configured to receive a SBO score from the decisioning engine and configured to assign a SBO tag to a cardholder.

In various embodiments, the decisioning engine may include a SBO model engine configured to compute an SBO model directive and a deterministic rules engine configured to compute a deterministic rules directive. The SBO score may include the SBO model directive, in response to the deterministic rules directive not indicating a deterministic outcome, and the SBO score may include the deterministic rules directive, in response to the deterministic rules directive indicating a deterministic outcome.

The SBO identification network host may include a SBO tag receiver configured to receive data representative of the cardholder and SBO tag and electronically indicate cross selling opportunities associated with the SBO tag.

In various embodiments, the electronically indicated cross-selling opportunities include at least one of transaction products, value-added services, or financial products. The SBO tag receiver may include a cross-selling targeting manager configured to present electronically indicated cross selling opportunities associated with the SBO tag to an electronic delivery network.

In various embodiments, the data element source set may include prospect data including at least one of demographics, income, tradeline history, family status, social media posting, or employment data of a prospective cardholder. The data element source set may include click stream data comprising the cardholder internet browsing history. The data element source set may include email data comprising text mining of email contents of the cardholder. The data element source set may include remittance data including banking data such as at least one of transaction data of the cardholder, historical account balance, present account balance, or transactions of the cardholder.

In various embodiments, the SBO score includes a value between zero and one indicative of a probability that the cardholder is a small business owner. In various embodiments, the SBO tag decisioner is configured to compare the SBO score to a scoring threshold and to associate a SBO tag with the cardholder in response to the comparing. In various embodiments, the SBO tag includes an affirmative SBO tag in response to the SBO score exceeding the scoring threshold.

In various embodiments, the deterministic rules engine is configured to determine a deterministic rules directive in response to a SBO rule set. In various embodiments, the deterministic rules directive includes a binary selection of 1 or 0 with 1 being indicative of 100% probability that the entity is a SBO and 0 being indicative of a 0% probability that the entity is a SBO. In various embodiments, the SBO rule set includes three deterministic rules indicative that a cardholder is a SBO, the deterministic rules including the data elements depict an active merchant relationship, the data elements depict a commercial credit report inquiry, and the data elements depict existing credit financials.

The SBO identification network may include a SBO identification network host configured to categorize a cardholder according to a SBO identification methodology, wherein the SBO identification network host directs data to be stored, a distributed storage system having a plurality of nodes, the distributed storage system configured to direct data to the SBO identification network host, in response to the SBO identification methodology of the SBO identification network host, and a telecommunications transfer channel including a network logically connecting the SBO identification network host to the distributed storage system.

The SBO identification methodology may include extracting, by a decisioning engine in communication with a processor and configured to accept data elements from a data element source set associated with a cardholder from a node of a distributed storage system, an entire consumer base from a data element set, identifying, by the decisioning engine, a consumer within the entire consumer base associated with a merchant relationship with a transaction account provider, creating, by the decisioning engine, a clean database comprising consumers associated with a merchant relationship with the transaction account provider, and eliminating, by the decisioning engine, any consumers from the clean database that are associated with data elements indicative that the consumer is simultaneously a SBO and a non-SBO, and determining, by the decisioning engine, a SBO likelihood.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

FIG. 5 illustrates model variables implemented by a SBO model engine as illustrated in FIG. 2, in accordance with various embodiments.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1:
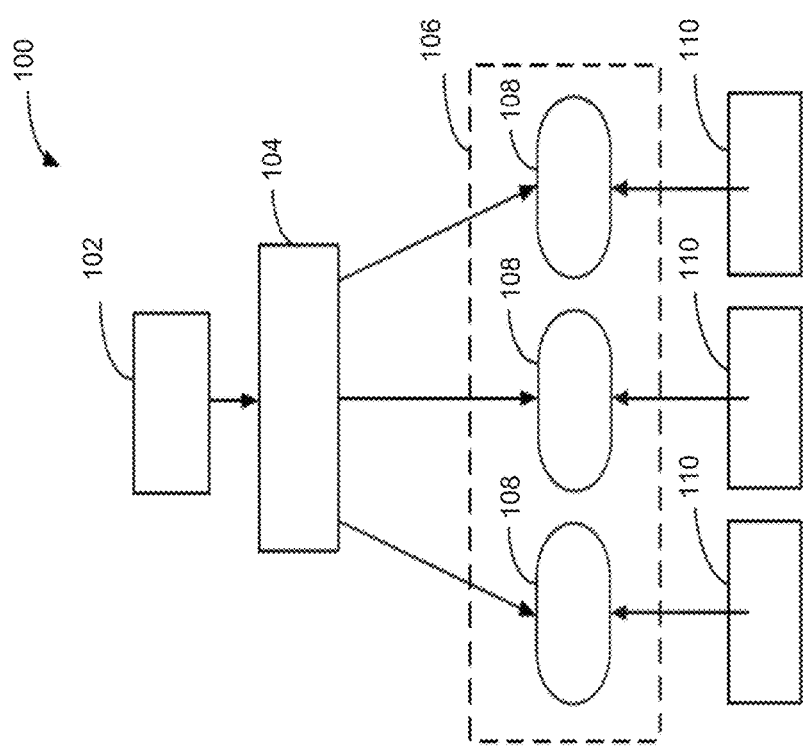
FIG. 1 illustrates an exemplary system for distributed storage and distributed processing, in accordance with various embodiments.

With reference to FIG. 1, system 100 for distributed data storage and processing is shown, in accordance with various embodiments. System 100 may comprise a SBO identification network host 102. SBO identification network host 102 may comprise any device capable of receiving and/or processing an electronic message via telecommunications transfer channel 104. Telecommunications transfer channel 104 may comprise a network. SBO identification network host 102 may take the form of a computer or processor, or a set of computers/processors, although other types of computing units or systems may be used, including laptops, notebooks, hand held computers, personal digital assistants, cellular phones, smart phones (e.g., iPhone®, BlackBerry®, Android®, etc.) tablets, wearables (e.g., smart watches and smart glasses), or any other device capable of receiving data over telecommunications transfer channel 104.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptography systems.

In various embodiments, SBO identification network host 102 may interact with distributed storage system 106 for storage and/or processing of big data sets. As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

In various embodiments, distributed storage system 106 may comprise one or more nodes 108. Nodes 108 may comprise computers or processors the same as or similar to SBO identification network host 102. Nodes 108 may be distributed geographically in different locations, housed in the same building, and/or housed in the same rack. Nodes 108 may also be configured to function in concert to provide storage space and/or processing power greater than one of a node 108 might provide alone. As a result, distributed storage system 106 may collect and/or store the data 110. Data 110 may be collected by nodes 108 individually and compiled or in concert and collated. Data 110 may further be compiled into a data set and formatted for use in SBO modeling method 400 of FIG. 3.

In various embodiments, data 110 may comprise a collection of data including and/or originating from cardholder information, transaction information, account information, record of sales, account history, customer history, sensor data, machine log data, data storage system, public web data, and/or social media. Data 110 may be collected from multiple sources and amalgamated into a big data structure such as a file, for example. In that regard, the data may be used as an input to generate metadata describing the big data structure itself, as well as the data stored in the structure. Data 110 may include all or a portion of a data element source set 210 (FIG. 2) as discussed further herein.

The distributed storage system 106 may comprise a transaction network. A SBO identification network host 102 may comprise various modules and engines as discussed herein wherein the probability that a transaction is executed by an individual or entity comprising a small business owner (SBO) may be evaluated for establishing proper usage of differentiated transaction instruments according to their proper purposes. For instance, a probable SBO transaction may be identified as being associated with a transaction, whereby the transaction network may tailor the handling of the transaction, such as by denying it, whereby the transaction network may actively deter misuse of transaction products not intended for SBOs, and/or such as by allowing it and or delivering value-added services, such as electronically provided advertisements and/or offers, and/or other credit and/or lending products, whereby the transaction network more properly functions according to approved parameters.

Moreover, such identifications enhance credit risk discrimination, identification of businesses and consumers associated with a business organization who may presently be consumer cardholders, whereby business-oriented transactions cards may be provided to them. Such identifications enable the promotion of relevant merchants to relevant cardholders such as to promote business-to-business relationship building and/or potential business-to-business relationships.

In various embodiments, a SBO determination involves multiple complex and interactive machine steps. For instance, by evaluating the data 110 at a transaction level, assessing the nature of a transaction at the individual transaction level provides sufficient granularity. Data may be evaluated at the transaction level and/or aggregated such as to determine if a cardholder (or supplementary card holder, or a third-party merchant with whom cardholders or supplementary card holders engage in transactions, or any other transaction party) may be identified as a SBO. Moreover, such identification may be combined with or enhance the identification of such aspects as card product type, merchant industry codes, transaction amounts, number of transactions by an individual or a business in an industry (or at a particular merchant in an industry), determination of gross sales, removal of noise inducing transactions, and/or controlling for transactions having similar profiles (such as to facilitate further data processing).

Thus, it may be appreciated that in view of the preceding discussion. SBO determinations may relate to three types of cardholders: individual card holders, small business cardholders, and large business cardholders. Each cardholder may be associated with one or more card type, such as for example, a consumer-oriented card and/or a business-oriented card. One may further appreciate that SBO determinations may facilitate the identification of credit risk, likelihood of fraud (for instance, consumer-oriented transactions on a business oriented transaction card indicating fraudulent use or business-oriented transactions on a consumer oriented transaction card indicating liquidity/access-to-capital problems and elevated default risk for the business), identification and classification of business-to-business transactions and counterparties to the transactions to facilitate marketing, and tailoring of online ad experiences. Even furthermore, cardholders having transactions inconsistent with their card type can be cross-marketed other card types and credit limits established. SBO determinations may further leverage text mining on names and addresses to identify SBOs and machine learning methodologies (e.g., gradient boosting decision trees) to identify the non-linear patterns of behavior exhibited by cardholders.

Figure 2:
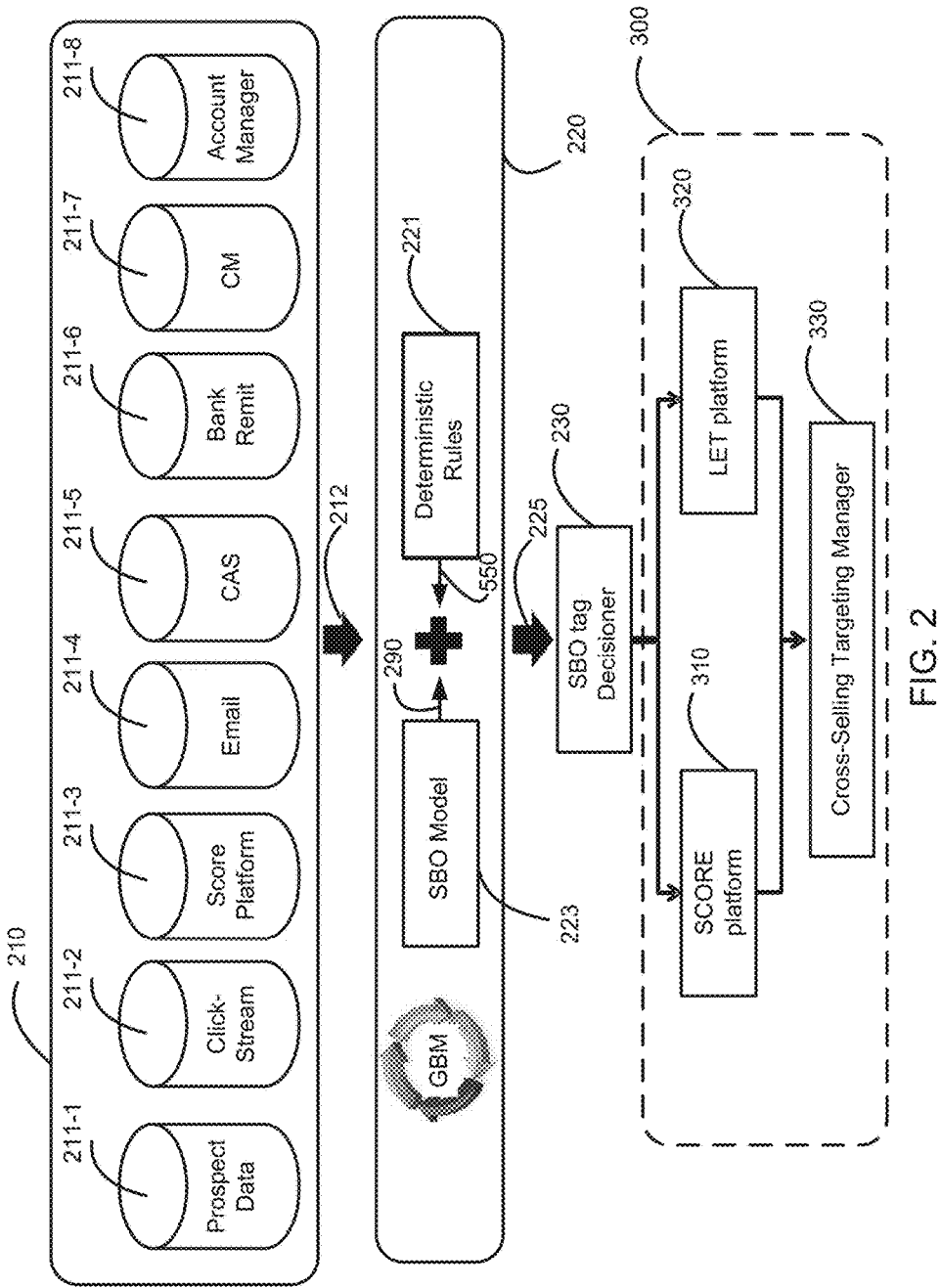
FIG. 2 illustrates an exemplary small business owner (SBO) identification network host component of a system according to FIG. 1, in accordance with various embodiments.

In various embodiments, and with reference to FIG. 2, a SBO identification network host 102 is described in more particular detail. For instance, a SBO identification network host 102 may comprise various logical modules configured to perform various operations and processes in accordance with methods disclosed herein.

A SBO identification network host 102 may comprise a data element source set 210. In further embodiments, the SBO identification network host 102 does not comprise the data element source set 210. Rather (with reference to FIGS. 1 and 2), the data 110 from nodes 108 of distributed storage system 106 comprises a data element source set 210 from which data elements 212 are provided to a SBO identification network host 102. A data element source set 210 comprises a set of data sources configured to be received and processed by a decisioning engine 220 of a SBO identification network host 102 whereby "SBO scores" are determined.

A SBO identification network host 102 may comprise a decisioning engine 220. A decisioning engine 220 may be configured to receive data elements 212 from a data element source set 210 and may be configured to compute a SBO score 225 and provide a SBO score 225 to an SBO tag decisioner 230. The decisioning engine 220 may be configured to compute an SBO score 225 indicative of a probability that an individual or organization (collectively, "entity") associated with a transaction is a small-business owner.

A SBO identification network host 102 may comprise a SBO tag decisioner 230. A SBO tag decisioner 230 may be configured to receive a SBO score 225 indicative of a probability that an entity associated with a transaction is a small-business owner, and may prepare a SBO tag in response to the probability. Stated differently, the SBO tag decisioner 230 may be said to "tag" the entity with a binary yes or now tag indicating whether that entity is a small business owner. As such, the SBO tag decisioner 230 may evaluate the SBO score 225 and interpret the SBO score 225 according to a scoring threshold. For instance, the SBO tag decisioner 230 may associate an affirmative SBO tag (e.g., "IS SMALL BUSINESS OWNER" tag) with an entity having an SBO score 225 greater than a scoring threshold. The SBO tag decisioner 230 may associate a negative SBO tag (e.g., "NOT A SMALL BUSINESS OWNER" tag) with an entity having an SBO score 225 not greater than a scoring threshold.

Finally, A SBO identification network host 102 may comprise a SBO Tag Receiver 300. In further embodiments, the SBO identification network host 102 does not comprises a SBO Tag Receiver 300, but is in communication with a SBO Tag Receiver 300. An SBO Tag Receiver 300 comprises at least one of a network, device, and/or human-operable interface configured to receive data representative of the entity with a SBO tag applied to it and electronically indicate cross selling opportunities, such as transaction products, value-added services, and/or financial products applicable to a SBO and/or a non-SBO, depending on the SBO score 225

Directing attention back to the data element source set 210, a data element source set may comprise a plurality of data element sources. For instance, any number of data element sources may be contemplated. For example, a data element source set may comprise a first data element source 211-1, a second data element source 211-2, a third data element source 211-3, a fourth data element source 211-4, a fifth data element source 211-5, a sixth data element source 211-6, a seventh data element source 211-7, and an eighth data element source 211-8. In various embodiments, the data element sources may comprise prospect data (e.g., data related to prospective cardholders such as demographics, income, tradelines, tradeline history, family status, social media posting, employment, and/or the like). The data element sources may comprise clickstream data (e.g., internet browsing history). The data element sources may comprise SCORE platform data (e.g., card provider internal data). The data element sources may comprise email data (e.g., interactions with the card member, text mining of email contents, and/or the like). The internal data may comprise data from an authorization system, for instance, data indicative of card member spending patterns, card member security questions and/or the like. The internal data may comprise bank remittance data (e.g., data provided by banks regarding transaction data of the cardholder, present and historical account balances, transactions, transaction timing, bill payment, and/or the like). The internal data may comprise account holder (e.g., cardmember) data, for example, name, age, address, billing and payment habits, transaction patterns, income, tradelines, tradeline history, family status, social media posting, employment, demographics and/or the like. The internal data may also comprise account monitoring data (e.g. credit bureau inquiries).

Directing attention back to the decisioning engine 220, the decisioning engine 220 may comprise an SBO model engine 223. An SBO model engine 223 may perform various complex and interoperable steps, such as according to a SBO modeling method 400 (See FIG. 3) wherein the data elements 212 are ingested, and a SBO model directive 290 generated. A SBO model directive 290 may comprise an SBO score 225, or in various embodiments, may be superseded by a deterministic rules directive 550 which comprises a SBO score 225, as will be discussed further herein. Thus, the SBO model directive 290 may comprise a fraction between 1 and 0, with 1 being indicative of 100% probability that the entity is a SBO and 0 being indicative of a 0% probability that the entity is a SBO.

Directing attention back to the decisioning engine 220, the decisioning engine 220 may comprise a deterministic rules engine 221. The deterministic rules engine 221 may perform various complex and interoperable steps, such as according to a deterministic rules protocol 500 (See FIG. 4) wherein the data elements 212 are ingested and a deterministic rules directive 550 produced. A deterministic rules directive 550 comprises a binary selection of 1 or 0 with 1 being indicative of 100% probability that the entity is a SBO and 0 being indicative of a 0% probability that the entity is a SBO. The decisioning engine 220 may override any SBO model directive 290 in the event that a deterministic rules directive 550 comprising a 1 is produced. Thus, the SBO score comprises the SBO model directive in response to the deterministic rules directive not indicating a deterministic outcome, and wherein the SBO score comprises the deterministic rules directive in response to the deterministic rules directive indicating a deterministic outcome.

Directing attention back to the SBO tag receiver 300, the SBO tag receiver 300 may comprise a SCORE platform 310. A SCORE platform 310 may comprise a data transfer facility configured to facilitate transfer of data from Hadoop to LET configured to receive an SBO score 225 and electronically indicate cross selling opportunities, such as transaction products, value-added services, and/or financial products applicable to a SBO and/or a non-SBO, depending on the SBO score 225.

Similarly, the SBO tag receiver 300 may comprise a LET platform 320. A LET platform 320 may comprise an execution system configured to select eligible consumers for marketing campaigns and configured to receive an SBO score 225 and electronically indicate cross selling opportunities, such as transaction products, value-added services, and/or financial products applicable to a SBO and/or a non-SBO, depending on the SBO score 225.

Finally, the SBO tag receiver 300 may comprise a cross-selling targeting manager 330. The cross-selling targeting manager may receive electronically indicated cross selling opportunities from the SCORE platform 310 and the LET platform 320 and transmit electronically indicated cross selling offers presenting the electronically indicated cross selling opportunities to an electronic delivery network such as for conveyance to the entity.

Figure 3:
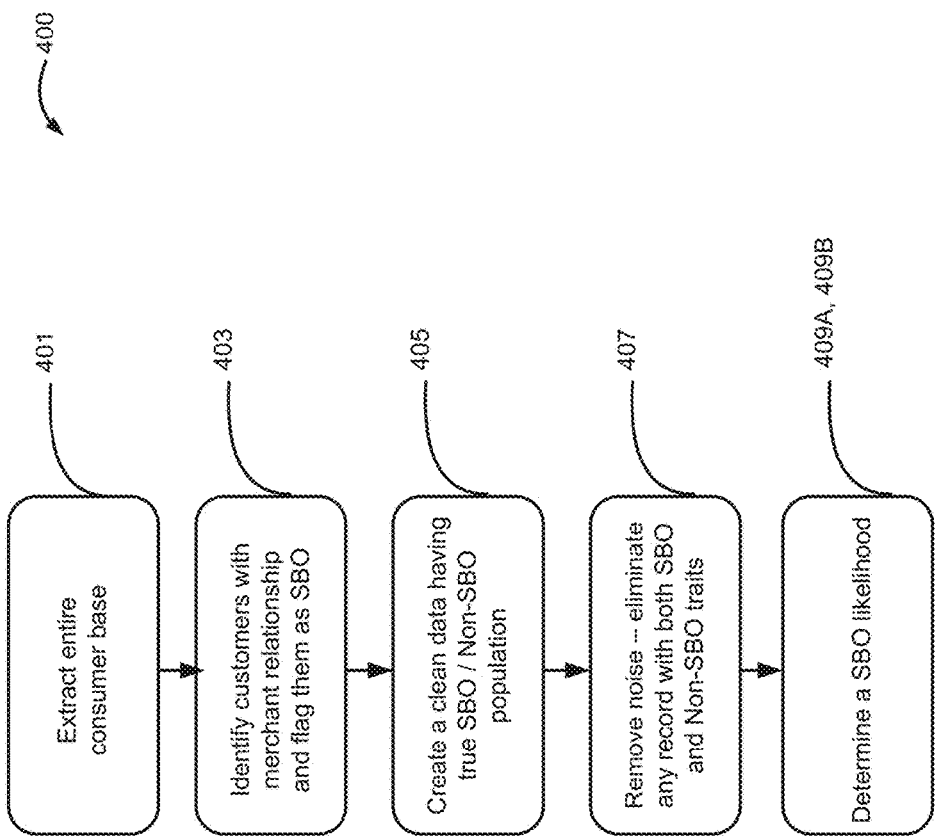
FIG. 3 illustrates an exemplary mechanism for SBO determination by a SBO identification network host component of FIG. 2, in accordance with various embodiments.

Having discussed various aspects of a SBO network host 200, attention is directed to FIG. 3, which depicts a SBO modeling method 400 performed by a decisioning engine 220 (FIG. 2). Thus, with reference to both FIGS. 2 and 4, a decisioning engine 220 may receive data elements 212 comprising an entire consumer base encompassed in the data element source set 210. The decisioning engine 220 may extract the entire consumer base from the data elements (Step 401). The decisioning engine 220 may identify consumers within the consumer base that have merchant relationships with the transaction account provider (e.g., are indicated to be merchants equipped to accept transaction cards from the transaction account provider and/or are indicated to have completed transactions with at least one merchant utilizing a card of the transaction account provider), thus being said to have a "merchant relationship with the transaction account provider" (Step 403). Thus, the decisioning engine 220 may create a clean database comprising only those consumers associated with a merchant relationship with a transaction account provider (Step 405). The decisioning engine 220 may eliminate any consumer associated with data elements from the data element set that indicate the customer simultaneously appears to be both a SBO and a non-SBO (e.g., with reference to FIG. 5, the data elements 212 comprise variables 213 that are inconsistent and/or contradictory) (Step 407). After determining that the consumer does not share both SBO and non-SBO traits, the decisioning engine may then determine a SBO likelihood (Step 409A, 409B). The determination of an SBO likelihood may comprise a determination according to the deterministic rules protocol 500 (See FIG. 4) wherein the data elements 212 are ingested and a deterministic rules directive 550 produced (e.g., Step 409B). The determination of an SBO likelihood may comprise a determination according to an SBO model directive 290 comprising an SBO score 225 (See FIGS. 2 and 5) (e.g., Step 409A).

Figure 6:
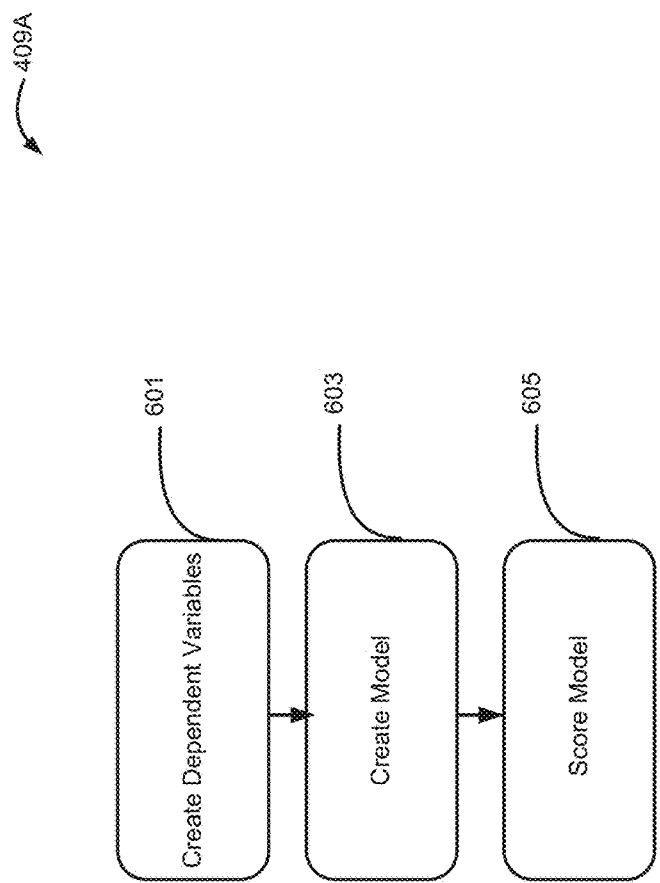
FIG. 6 illustrates an example method of the step of determining a SBO likelihood as illustrated in FIG. 3, in accordance with various embodiments.

For instance, and with additional reference to FIGS. 5 and 6, the step of determining a SBO likelihood 409A may include creating dependent variables (Step 601). For example, data elements 212 may be ingested comprising variables 213. For instance, first variable 213-1 through thirteenth variable 213-13 may be ingested. The variables may comprise whether the consumer exists in a commercial credit bureau. The variables may comprise a magnitude of total business spending. The variables may comprise a percentage of payments made through company checks. The variables may comprise a costumer's "Prob-B" determination. For instance, various aspects of co-owned pending patent application Ser. No. 14/954,430, entitled "SYSTEM AND METHOD FOR DATA ANALYTICS," and filed on Nov. 30, 2015, such as a so-called "Prob-B" determination may be considered, such disclosure is incorporated by reference herein in its entirety for all purposes. The variables may comprise a count of commercial credit bureau hits (e.g., D&B, Infogroup, Equifax, and/or the like). The variables may comprise the number of active supplementary relationships (e.g., association with transaction products of others) of the consumer. The variables may include a unique email domain indicator, such as may be held by small businesses. The variables may include the number of commercial credit inquiries against the consumers credit report, such as via Experian. The variables may include the number of webpages visited by the consumer that are affiliated with the transaction account provider and are business (rather than consumer) oriented. The variables may include the number of card members and/or small business owners living in the customer's neighborhood. Moreover, the variables may further comprise a third highest Prob-B score, second highest Prob-B score, and first highest Prob-B score of the card holder, for instance, a first second and third highest probability that a transaction is for a business purpose. Moreover, the variables may comprise text mining of data elements 212 to identify potential SBOs such as by identifying titles (e.g., "owner," "CEO," "Founder," "Principal," and/or the like Furthermore, the variables 213 may be ascribed differing importance as indicated in FIG. 5, so that a model is created (Step 603). For instance, variables 213 may be ascribed differing weight (e.g., importance) on a scale of 0 to 100, with 100 being determinative. Moreover, the model may be scored (Step 605). In other words, thus, the relatively more important variables may be ascribed greater weight and an average may be computed. This average may be divided by 100 to create a SBO model directive 290 comprising a number between zero and one.

Figure 4:
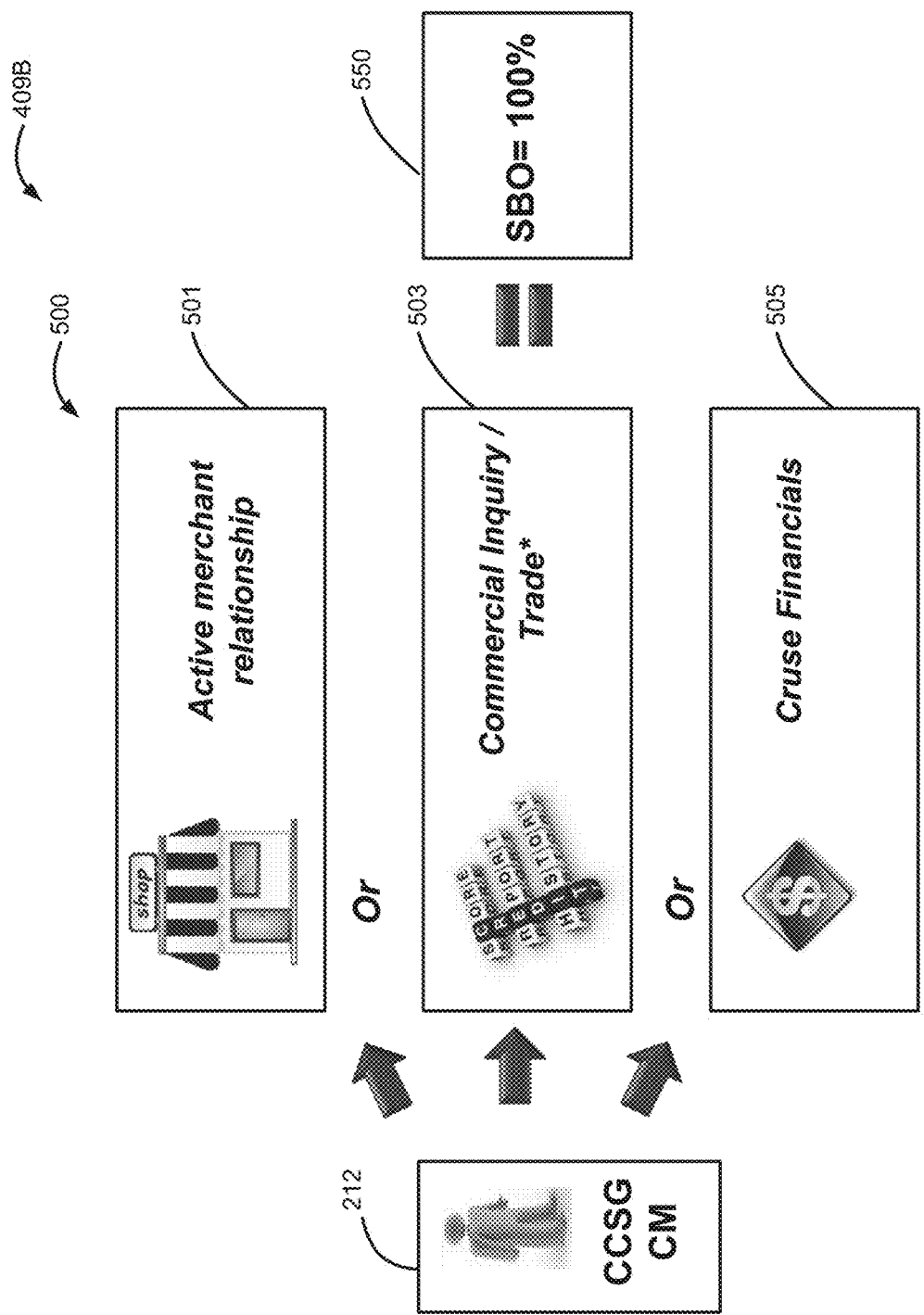
FIG. 4 illustrates deterministic rules implemented by a deterministic rules engine as illustrated in FIG. 2, in accordance with various embodiments.

With attention to FIG. 2 and FIG. 4, the step of determining a SBO likelihood 409B may include that the deterministic rules engine 221 may calculate a deterministic rules directive 550, which as mentioned, may override the SBO model directive 290. Thus, in various embodiments, for instance, a deterministic rules engine 221 may execute a deterministic rules protocol 500, wherein any cardholder for whom the data elements 212 depict one or more of three scenarios as determinatively an SBO, so that a deterministic rules directive 550 (comprising an indication that the cardholder is determinatively an SBO) is generated. For instance, the three scenarios comprise wherein the data elements 212 include an active merchant relationship 501 (e.g., the cardholder is a registered merchant configured to receive payments via a transaction instrument of the transaction account provider), or for whom the data elements 212 depict a commercial credit report inquiry (e.g., a business trade line and/or credit reporting inquiry seeking a business trade line) 503 as extant, or for whom cruse financials (e.g., financial statements submitted by a customer) 505 exist.

Data, as discussed herein, may include "internal data." Internal data may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YouTube®, AppleTV®, Pandora®, xBox®, Sony® 2 Playstation®), a uniform resource locator ("URL"), a document (e.g., a Microsoft Word® document, a Microsoft Excel® document, an Adobe .pdf document, etc.), an "ebook," an "emagazine," an application or microapplication (as described herein), an SMS or other type of text message, an email, Facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and/or a mobile device communication. Examples of social media sites include Facebook®, Foursquare®, Twitter®, MySpace®, LinkedIn®, and the like. Examples of affiliate or partner websites include American Express®, Groupon®, LivingSocial®, and the like. Moreover, examples of mobile device communications include texting, email, and mobile applications for smartphones.

A "consumer profile," "customer data," or "consumer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT), Windows 95/98/2000®, Windows XP®, Windows Vista®, Windows 7®, OS2, UNIX®, Linux®, Solaris®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, and optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware to perform the functions described herein will be apparent to persons skilled in the relevant art(s).

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL. PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A. B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example. A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A small business owner (SBO) identification network host comprising:
   a processor;
   a tangible, non-transitory memory configured to communicate with the processor,
   wherein the tangible, non-transitory memory has instructions stored thereon that, in response to execution by the processor, cause the processor to perform operations;
   a decisioning engine in communication with the processor and configured to:

extract a consumer base from data elements,
  wherein the data elements are from a data element source set associated with consumers, and
  wherein the data elements are from a node of a distributed storage system;
create a clean database by identifying the consumers within the consumer base that have a merchant relationship with a transaction account provider, wherein the consumers completed transactions with at least one merchant using a transaction account associated with the transaction account provider;
eliminate a subset of the consumers from the clean database that are associated with the data elements comprising variables that are inconsistent and indicative that the subset of consumers are simultaneously a SBO and a non-SBO; and
determine an SBO score for each of the consumers according to a deterministic rules protocol using a model directive to determine the SBO score; and
a SBO tag decisioner in communication with the processor and configured to receive the SBO score from the decisioning engine and configured to assign a SBO tag to the consumers.

2. The SBO identification network host according to claim 1, wherein the decisioning engine further comprises:
a SBO model engine configured to compute the model directive; and
a deterministic rules engine configured to compute a deterministic rules directive for the deterministic rules protocol,
wherein the SBO score comprises the model directive in response to the deterministic rules directive not indicating a deterministic outcome, and
wherein the SBO score comprises the deterministic rules directive in response to the deterministic rules directive indicating the deterministic outcome.

3. The SBO identification network host according to claim 1, further comprising a SBO tag receiver configured to receive data representative of the consumers and representative of the SBO tag, and the SBO tag receiver is configured to electronically indicate cross selling opportunities associated with the SBO tag.

4. The SBO identification network host according to claim 3, wherein the electronically indicated cross-selling opportunities comprise at least one of transaction products, value-added services, or financial products.

5. The SBO identification network host according to claim 3, wherein the SBO tag receiver comprises a cross-selling targeting manager configured to present the electronically indicated cross selling opportunities associated with the SBO tag to an electronic delivery network.

6. The SBO identification network host according to claim 1, wherein the data element source set comprises prospect data comprising at least one of demographics, income, tradeline history, family status, social media posting, or employment data of prospective consumers.

7. The SBO identification network host according to claim 1, wherein the data element source set comprises click stream data comprising internet browsing history for the consumers.

8. The SBO identification network host according to claim 1, wherein the data element source set comprises email data comprising text mining of email contents of the consumers.

9. The SBO identification network host according to claim 1, wherein the data element source set comprises remittance data comprising banking data comprising at least one of historical account balance, present account balance, or transactions of the consumers.

10. The SBO identification network host according to claim 1, wherein the SBO score comprises a value between zero and one indicative of a probability that the consumers are small business owners.

11. The SBO identification network host according to claim 1, wherein the SBO tag decisioner is further configured to compare the SBO score to a scoring threshold and to associate the SBO tag with the consumers in response to the comparing.

12. The SBO identification network host according to claim 2, wherein the deterministic rules engine is further configured to determine the deterministic rules directive in response to a SBO rule set.

13. The SBO identification network host according to claim 12, wherein the deterministic rules directive comprises a binary selection of 1 or 0 with 1 being indicative of 100% probability that the consumers are the SBO and 0 being indicative of a 0% probability that the consumers are the SBO.

14. The SBO identification network host according to claim 13, wherein the SBO rule set comprises deterministic rules indicative that the consumers are the SBO, the deterministic rules comprising:
the data elements depict an active merchant relationship;
the data elements depict a commercial credit report inquiry; and
the data elements depict existing credit financials.

15. The SBO identification network host according to claim 1, wherein the SBO identification network host is part of a SBO identification network.

16. The SBO identification network host according to claim 1, wherein the SBO identification network host directs data to be stored.

17. The SBO identification network host according to claim 1, wherein the SBO identification network host is part of a SBO identification network, and wherein the SBO identification network further comprises the distributed storage system comprising a plurality of nodes.

18. The SBO identification network host according to claim 1, wherein the SBO identification network host is part of a SBO identification network, wherein the SBO identification network further comprises the distributed storage system comprising a plurality of nodes, and wherein the distributed storage system is configured to direct data to the SBO identification network host, in response to an SBO identification methodology of the SBO identification network host.

19. The SBO identification network host according to claim 1, wherein the SBO identification network host is part of a SBO identification network, and wherein the SBO identification network further comprises a telecommunications transfer channel comprising a network logically connecting the SBO identification network host to the distributed storage system.

20. A SBO identification methodology comprising:
extracting, by a decisioning engine, a consumer base from data elements,
  wherein the data elements are from a data element source set associated with consumers, and
  wherein the data elements are from a node of a distributed storage system;

creating, by the decisioning engine, a clean database by identifying the consumers within the consumer base that have a merchant relationship with a transaction account provider,
wherein the consumers completed transactions with at least one merchant using a transaction account associated with the transaction account provider;
eliminating, by the decisioning engine, a subset of the consumers from the clean database that are associated with the data elements comprising variables that are inconsistent and indicative that the subset of consumers are simultaneously a SBO and a non-SBO; and
determining, by the decisioning engine, an SBO score for each of the consumers according to a deterministic rules protocol using a model directive to determine the SBO score,
wherein a SBO tag decisioner receives the SBO score from the decisioning engine and assigns a SBO tag to the consumers.

* * * * *